United States Patent
Okamuro et al.

(10) Patent No.: US 6,763,923 B1
(45) Date of Patent: Jul. 20, 2004

(54) METHOD AND APPARATUS FOR A VEHICLE BRAKING SYSTEM

(75) Inventors: Kenneth James Okamuro, Statesville, NC (US); Richard James Honeyager, Conover, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/315,392

(22) Filed: Dec. 9, 2002

(51) Int. Cl.[7] .......................... B60K 41/26; F16D 67/04
(52) U.S. Cl. .................. 192/221; 192/13 R; 303/3; 303/5; 477/95
(58) Field of Search ................................ 192/218, 219, 192/220, 221, 225, 13 R; 477/94, 95; 303/2, 5

(56) References Cited

U.S. PATENT DOCUMENTS

| | | | | |
|---|---|---|---|---|
| 3,313,383 A | * | 4/1967 | La Tendresse | 192/221 |
| 3,696,897 A | * | 10/1972 | Kitano et al. | 192/221 |
| 3,854,559 A | * | 12/1974 | Talak et al. | 192/221 |
| 4,231,455 A | | 11/1980 | Fuehrer | |
| 5,105,923 A | | 4/1992 | Iizuka | |
| 2003/0233186 A1 | * | 12/2003 | Chess | 701/95 |

OTHER PUBLICATIONS

60/388,533.*

* cited by examiner

Primary Examiner—Rodney H. Bonck
(74) Attorney, Agent, or Firm—Marshall & Melhorn, LLC.

(57) ABSTRACT

An apparatus for, and a method of, braking a vehicle by selectively providing pressurized transmission fluid through at least one valve to brake a vehicle drivetrain proportionally to the engagement of a brake system activation means.

7 Claims, 8 Drawing Sheets

METHOD AND APPARATUS FOR A VEHICLE BRAKING SYSTEM

BACKGROUND OF THE INVENTION

1. Field of the Invention

The present invention relates to a method and apparatus for a vehicle braking system. More particularly, the present invention relates to a method and apparatus for a vehicle braking system having at least one valve to provide a fluid pressure to a first directional transmission clutch rotating in a first direction to urge a second directional transmission clutch rotating in a direction opposite the first direction with a vehicle drivetrain to slow, or brake, the vehicle drivetrain.

2. Discussion of the Related Art

Engine braking control systems are well-known in the art. One such system has been described in U.S. Pat. No. 4,231,455. U.S. Pat. No. 4,231,455 depicts an air brake system to control the application of a separate and dedicated clutch brake and a transmission clutch simultaneously. More specifically, when braking is desired, the transmission controls act to engage one gear ratio establishing device for one ratio drive and the brake control engages the output brake and a second gear ratio establishing device for output and gear reaction braking. A brake piston acts on the brake clutch and the transmission clutch to put the planetary rings into kinematic lock.

In U.S. Pat. No. 5,105,923 an engine braking control system is provided which is capable of applying engine braking through the transmission as well as wheel braking. The system has shift solenoids which are activated to perform the down-shift operation by selectively engaging and disengaging frictional elements in a gear train. Sensors for monitoring vehicle speed, an opening angle of a throttle valve and the amount of depression of the brake pedal generating respective signals are included. The engine brake system receives each of the respective signals and compares them to predetermined stored values to control the down-shift operation.

The present invention has an advantage over the prior art by using the hydrodynamic transmission of the vehicle to absorb part of the braking energy thus reducing the size and cost of the service brakes for the vehicle. The present invention has a further advantage over the prior art of not requiring a separate brake clutch or a complicated downshift operation to slow, or brake, the vehicle.

SUMMARY OF THE INVENTION

The invention relates to a vehicle braking system having a brake system activation means for receiving a braking signal. At least one valve is connected to the brake system activation means for providing a fluid pressure through such as, for example, a pressurized transmission fluid, proportionally to the braking signal to a first directional transmission clutch rotating in a first direction. A second directional transmission clutch rotates in a second direction opposite the first direction with a vehicle drivetrain. Both the first and the second directional transmission clutches are connected to the vehicle drivetrain. The pressurized transmission fluid causes the first directional transmission clutch to urge the drivetrain to rotate in the first direction thus slowing, or braking, the drivetrain. A service brake system is connected to the vehicle brake system activation means to selectively engage at least one service brake.

BRIEF DESCRIPTION OF THE DRAWINGS

The above, as well as other advantages of the present invention, will become readily apparent to those skilled in the art from the following detailed description when considered in light of the accompanying drawings in which.

DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
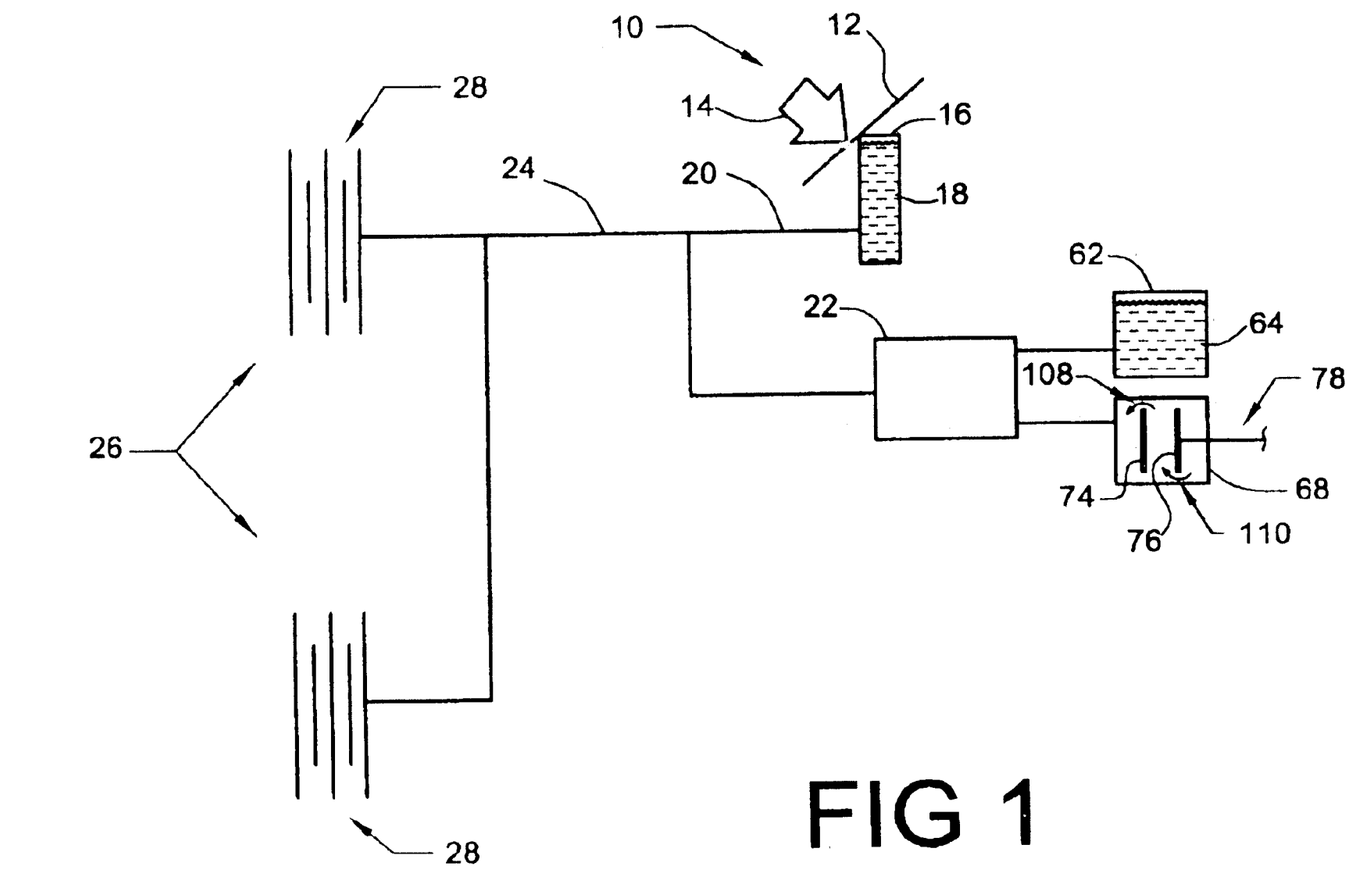
FIG. 1 is a schematic view of a construction embodying the present invention.

In FIG. 1, a vehicle brake system activation means 10, such as a vehicle brake pedal 12, for receiving a braking signal 14 is schematically depicted in a first embodiment of the present invention. The braking signal 14 may be, for example, engagement of the brake pedal 12 by a vehicle operator. The pedal 12 is mechanically or electrically connected to a brake fluid supply 16 having a quantity of brake fluid 18 located therein. At least a first brake line 20 provides brake fluid 18 from the brake fluid supply 16 to at least one valve 22. Additional brake lines (not shown) for providing brake fluid 16 to the valve 18 may be used without departing from the scope of the invention. Preferably, the brake fluid 18 is pressurized by pressurization means (not shown) known to those skilled in the art.

At least a second brake line 24 provides pressurized brake fluid 18 to a vehicle service brake system 26 as shown in FIG. 1. The service brake system 26 may have, for example, at least one pressure apply brake 28 known to those skilled in the art although other vehicle service brake systems are well within the scope of the invention.

Figure 2:
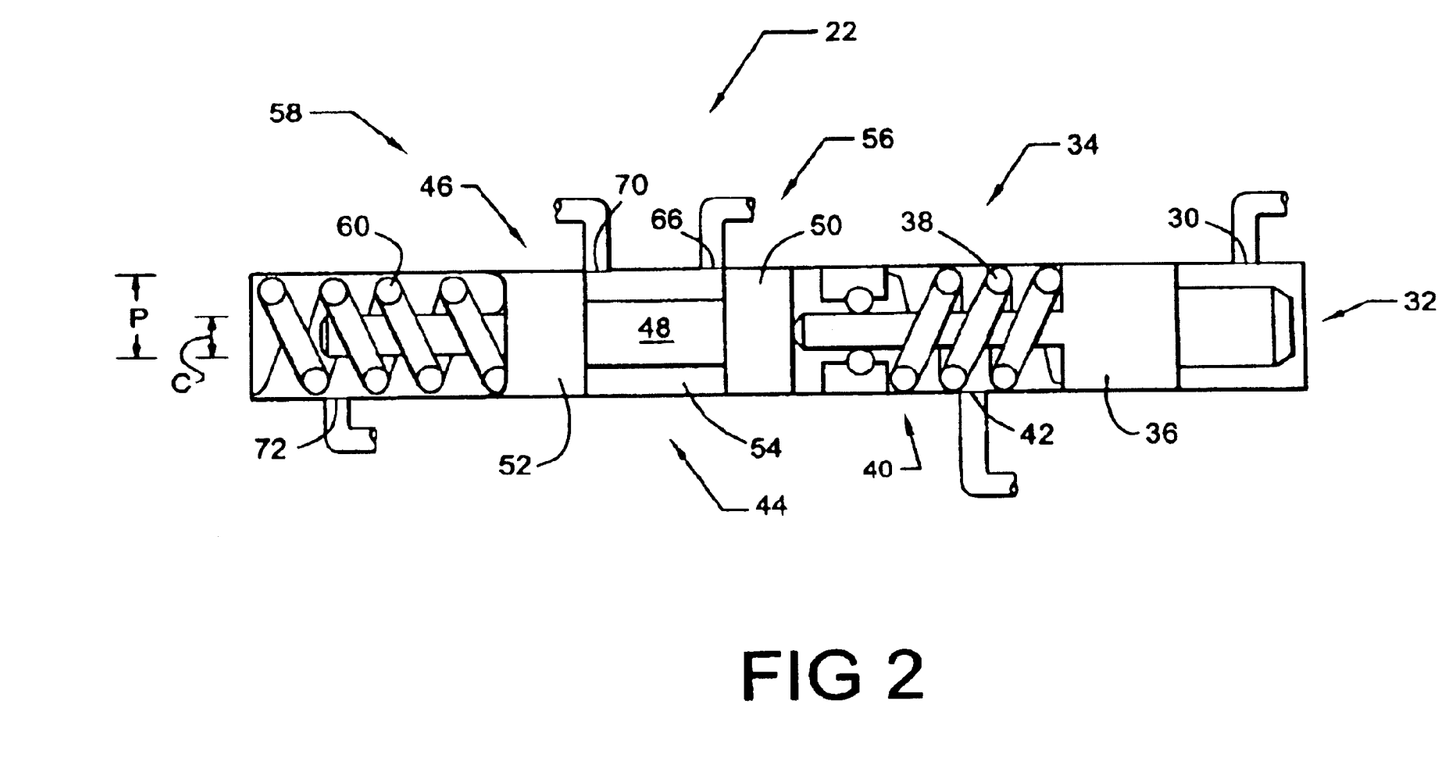
FIG. 2 is a sectional side view showing a portion of the construction shown in FIG. 1.

As shown in FIG. 2, the valve 22 has at least a first port 30 for receiving the pressurized brake fluid 18. Preferably, the first port 30 is located adjacent a first end 32 of a first valve chamber 34 of the valve 22. A brake fluid piston 36 is moveably located within the first valve chamber 34. At least one first valve chamber spring 38 is located adjacent a second end 40 of the first valve chamber 34. The first valve chamber spring 38 is connected to the brake fluid piston 36. The spring 38 urges the brake fluid piston 36 toward the first end 32 of the first valve chamber 34. At least a second port 42 is located adjacent the second end 40 of the first valve chamber 34 for sending any pressurized brake fluid 18 to a brake fluid sump (not shown), which moves past the brake fluid piston 36.

The brake fluid piston 36 is connected to a transmission fluid spool 44 moveably located within a second valve chamber 46 adjacent the first valve chamber 34. The transmission fluid spool 44 has a cylinder 48 with a radius C. The spool 44 also has wide first 50 and second 52 circular plates at each end of the cylinder 48 which each have a radius P. The radius P is greater than the radius C, creating a recessed portion 54 between the plates 50, 52.

The second valve chamber 46 has a first end 56 and a second end 58. At least one second valve chamber spring 60 is located adjacent the second end 58 of the second valve chamber 46. The second valve chamber spring 60 is connected to the transmission fluid spool 44. The second valve chamber spring 60 urges the transmission fluid spool 44 toward the first end 56 of the second valve chamber 46.

As depicted in FIGS. 1 and 2, the second valve chamber 46 is connected to a source 62 for fluid pressure such as, for example, a pressurized transmission fluid 64 at least through a third port 66. The second valve chamber 46 is also connected to a transmission clutch housing 68 through at least a fourth port 70. At least a fifth port 72 adjacent the second end 58 of the second valve chamber 46 is connected to a transmission fluid sump (not shown) to remove any transmission fluid 64 that may have moved past the spool 44. A sixth port (not shown) adjacent the first end 56 of the second valve chamber 46 may also be connected to the transmission fluid sump to remove any transmission fluid 64 that may have moved past the spool 44.

The fourth port 70 of the second valve chamber 46 is connected to a first directional transmission clutch 74 located within the transmission clutch housing 68 as schematically depicted in FIG. 1. The first 74 and the second 76 directional transmission clutches are both connected to a vehicle drivetrain 78. The second directional transmission clutch 76 is exposed to a substantially constant fluid pressure such as, for example, through a pressurized transmission fluid.

Figure 3:
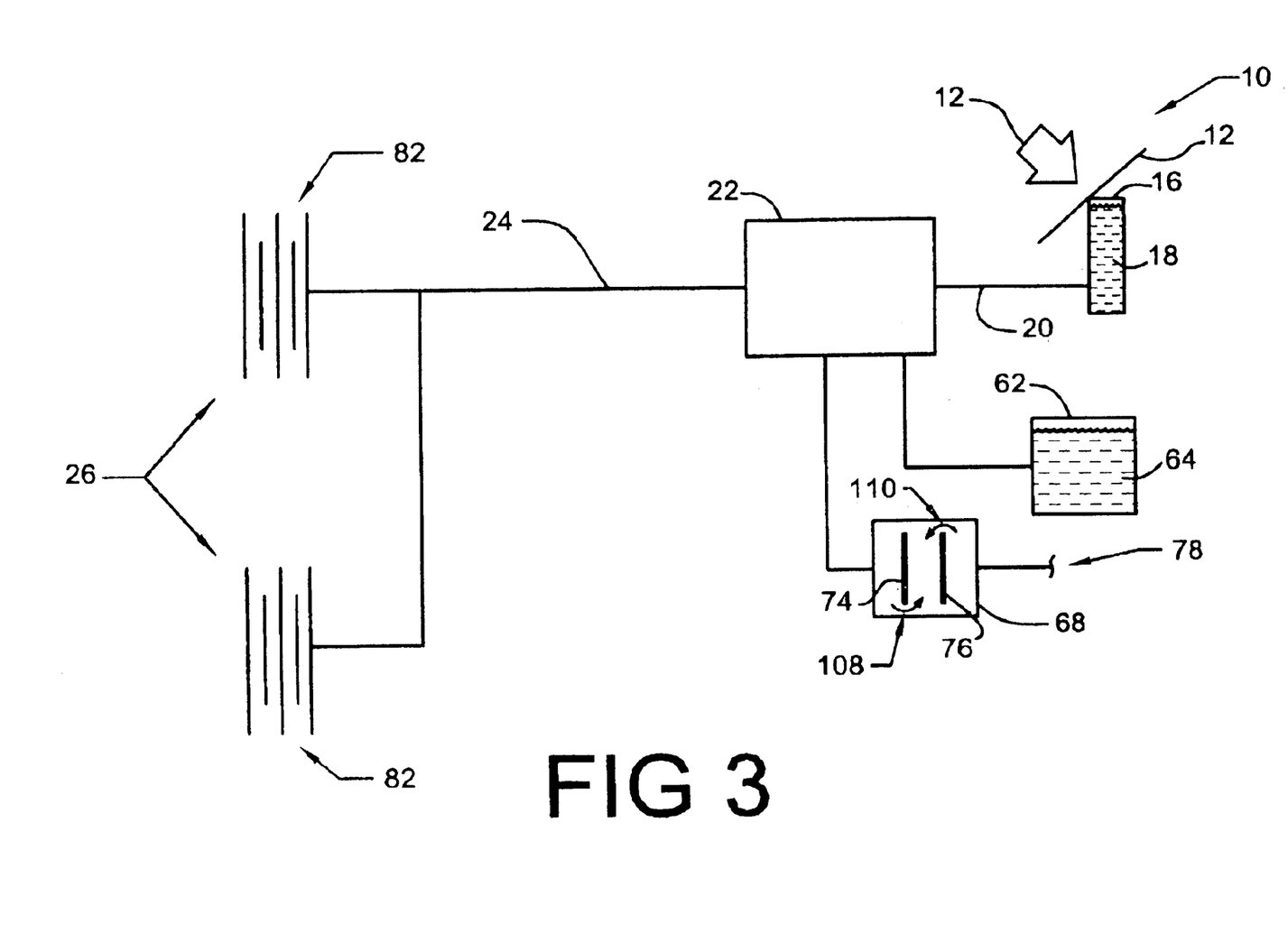
FIG. 3 is a schematic view of a construction embodying the present invention.
Figure 4:
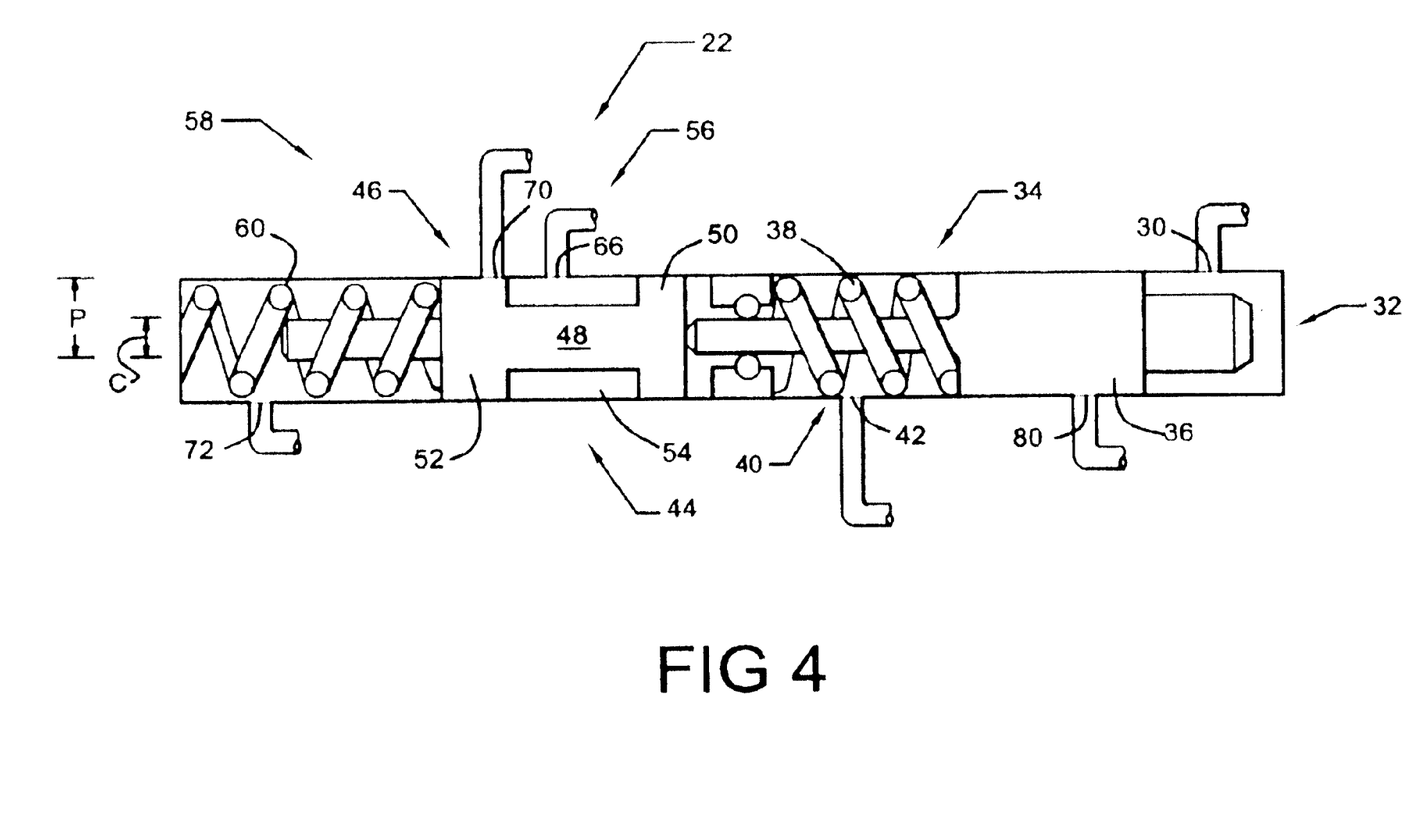
FIG. 4 is a sectional side view showing a portion of the construction shown in FIG. 3.

FIG. 3 schematically depicts a second embodiment of the present invention having the elements substantially as described above. As shown in FIG. 4, this embodiment includes the valve 22 having a service brake port 80 located adjacent the first end 32 of the first valve chamber 34 for providing brake fluid 18 to a service brake system 26 having, for example, at least one spring apply, hydraulic release brake 82 known to those skilled in the art.

Figure 5:
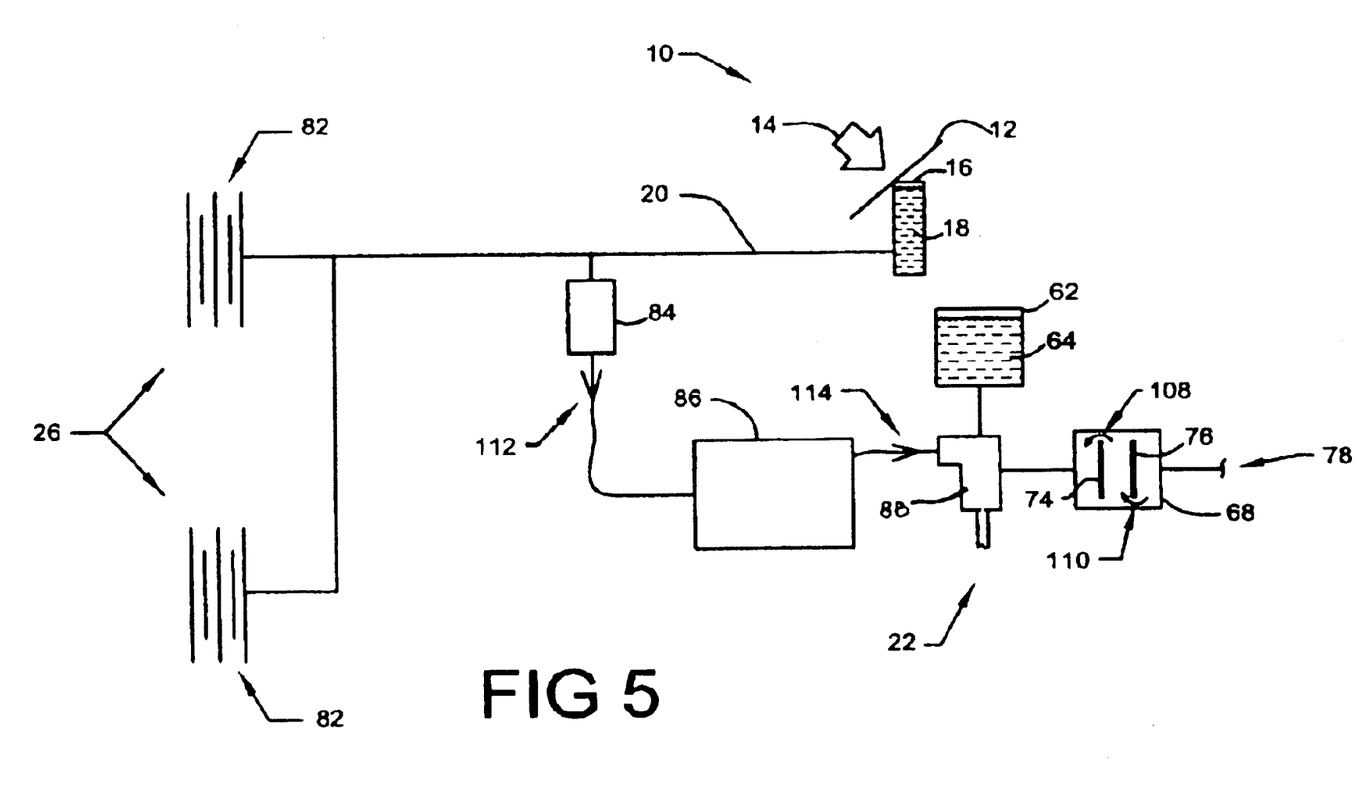
FIG. 5 is a schematic view of a construction embodying the present invention.

FIG. 5 schematically depicts a third embodiment of the present invention having a vehicle brake system activation means 10, such as a vehicle brake pedal 12, for receiving a braking signal 14. The pedal 12 is mechanically or electrically connected to a brake fluid supply 16 having a quantity of brake fluid 18 located therein. At least a first brake line 20 provides brake fluid 18 from the brake fluid supply 16 to a brake fluid pressure sensor 84. The first brake line 20 also provides brake fluid 18 to a service brake system 26 such as, for example, at least one spring apply, hydraulically release brake 82.

The third embodiment preferably also has an electronic controller 86 electronically connected to the brake fluid pressure sensor 84. The electronic controller 86 is electronically connected to at least one valve 22, such as a directional clutch proportional solenoid 88. The directional clutch proportional solenoid 88 is preferably connected to a source 62 for fluid pressure such as, for example, a pressurized transmission fluid 64, and the transmission clutch housing 68 described above.

Figure 6:
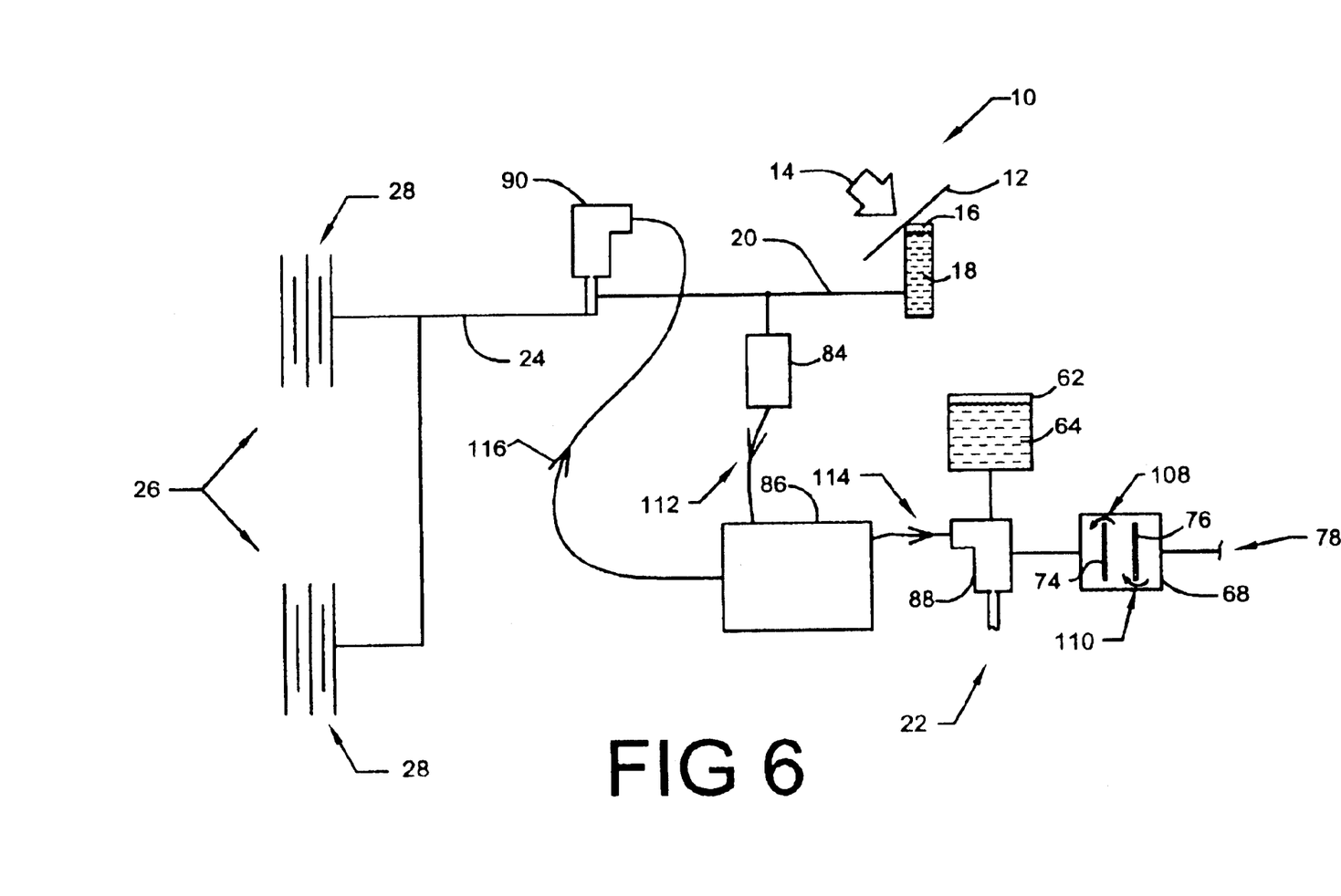
FIG. 6 is a schematic view of a construction embodying the present invention.

FIG. 6 schematically depicts a fourth embodiment of the present invention having a vehicle brake system activation means 10, such as a vehicle brake pedal 12, for receiving a braking signal 14. The pedal 12 is mechanically or electrically connected to a brake fluid supply 16 having a quantity of brake fluid 18 located therein. At least a first brake line 20 provides brake fluid 18 from the brake fluid supply 16 to both a brake fluid pressure sensor 84 and a service brake proportional solenoid 90.

The brake fluid pressure sensor 84 is electrically connected to an electronic controller 86 which is electronically connected to at least one valve 22, such as a directional clutch proportional solenoid 88 substantially as described above. The service brake proportional solenoid 90 is electronically connected to the electronic controller 86 and connected to the first brake line 20. The service brake proportional solenoid 90 is also connected to a service brake system 26 such as, for example, at least one pressure apply service brake 28 known to those skilled in the art through brake line 24.

Figure 7:
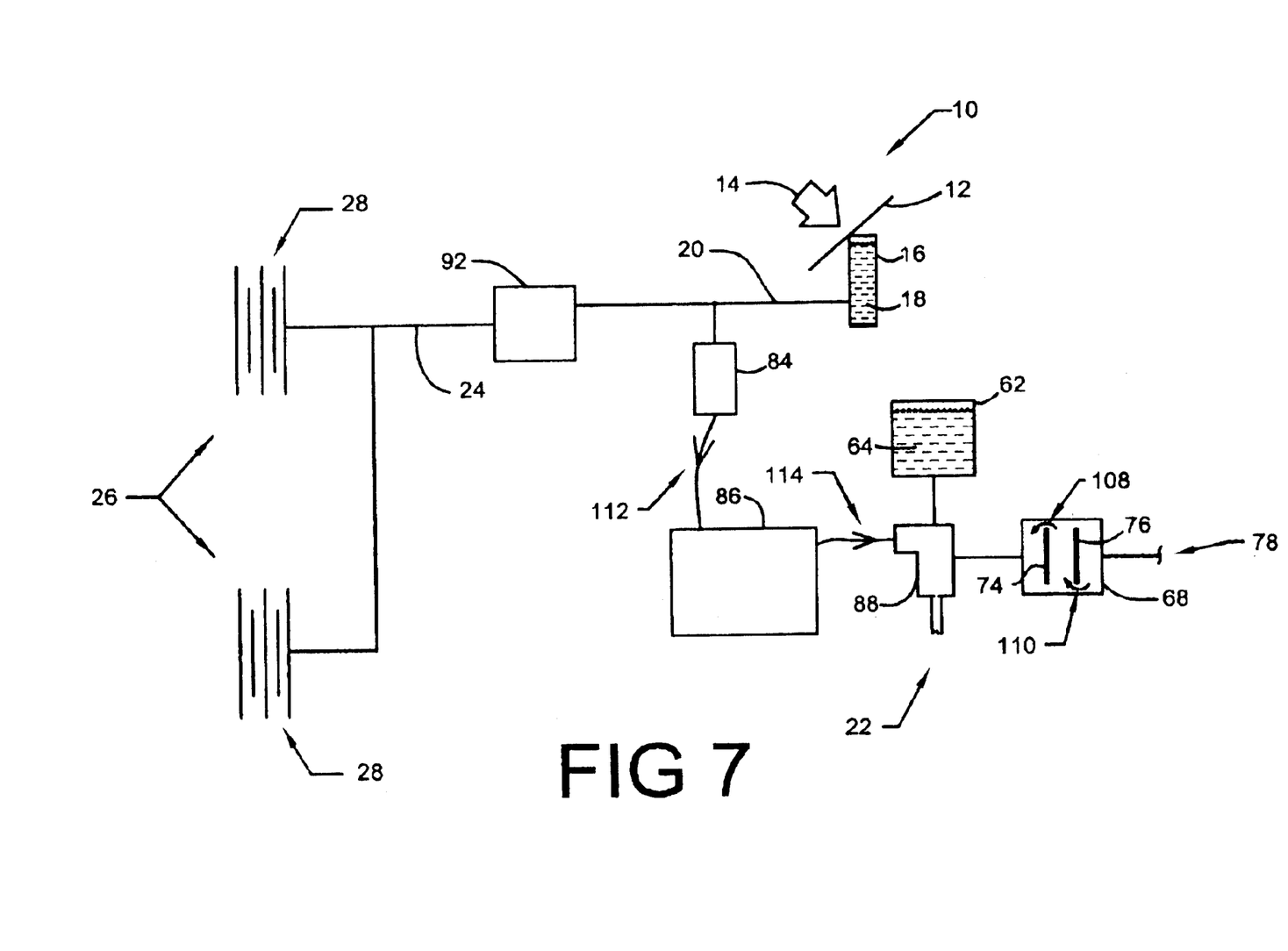
FIG. 7 is a schematic view of an alternative embodiment of the construction shown in FIG. 6.
Figure 8:
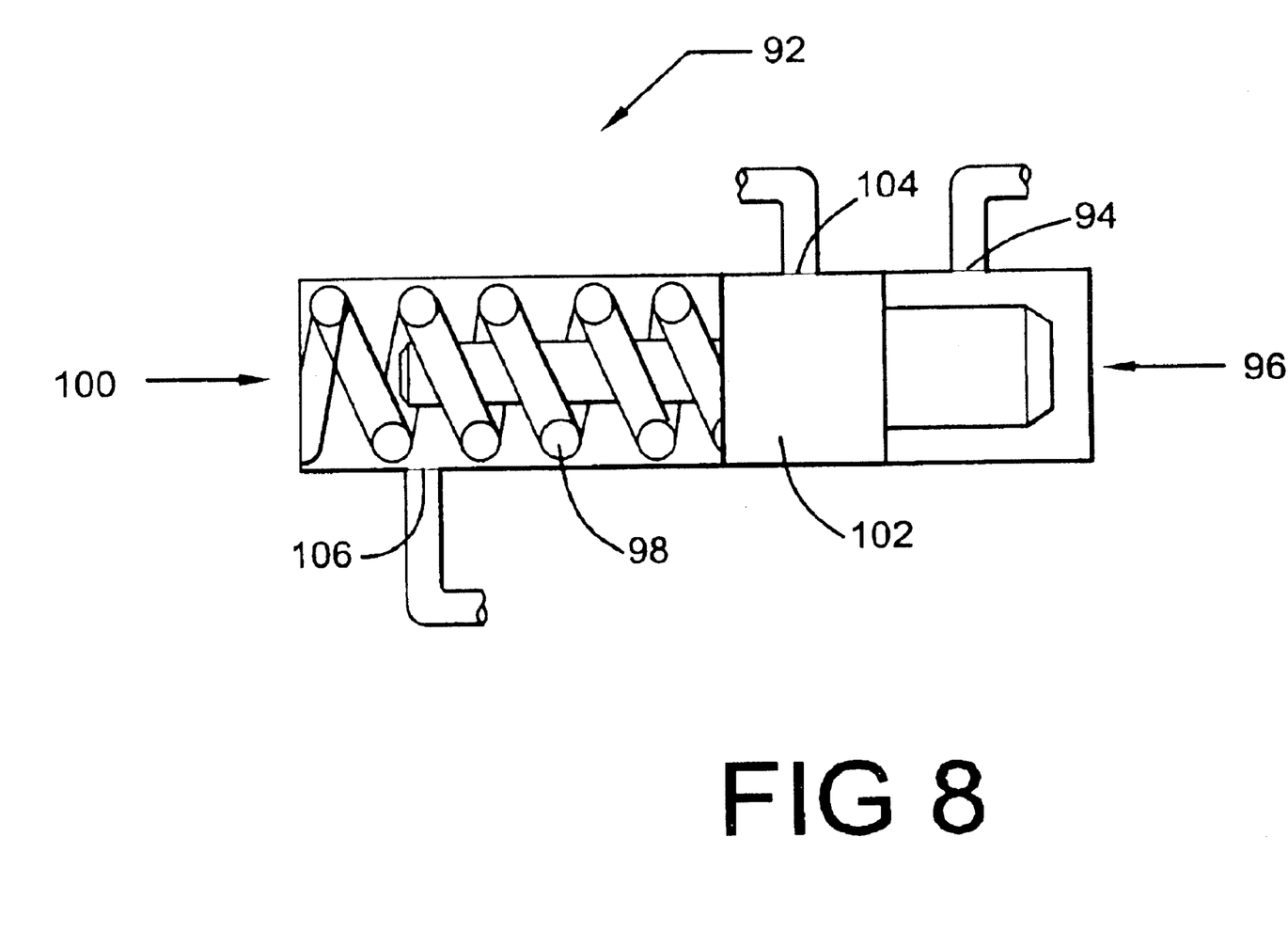
FIG. 8 is a sectional side view showing a portion of the construction shown in FIG. 7.

Yet another embodiment of the invention is depicted in FIG. 7. FIG. 7 depicts a brake fluid pressure sensor 84 electronically connected to an electronic controller 86 substantially as described above. The controller 86 is electronically connected with at least one valve 22, such as a directional clutch proportional solenoid 88 substantially as described above. A first brake line 20 provides brake fluid 18 from the brake fluid supply 16 to the brake fluid sensor 84 and a mechanical pressure valve 92. As shown in FIG. 8, the mechanical pressure valve 92 has a first port 94 in a first end 96 of the mechanical pressure valve 92 for receiving pressurized brake fluid 18. At least one spring 98 is located adjacent a second end 100 of the mechanical pressure valve 92. The at least one spring 98 is connected to a brake fluid piston 102 also located within the mechanical pressure valve 92. The mechanical pressure valve 92 has a second port 104 for providing pressurized brake fluid 18 to a service brake system 26, such as, for example, at least one pressure apply service brake 28 known to those skilled in the art. The mechanical pressure valve 92 has a third port 106 for sending pressurized brake fluid 18 away from the mechanical pressure valve 92 to a brake fluid sump (not shown), that has moved past the brake fluid piston 102.

In the process of using the first embodiment of the above-described vehicle braking system a vehicle is braked by a vehicle operator engaging the vehicle brake system activation means 10, such as, for example, the brake pedal 12. The engagement of the brake system activation means 10 causes pressurized brake fluid 18 to move from the pressurized brake fluid source 16 to the service brake system 26 through the second brake line 24 as depicted in FIG. 1.

Pressurized brake fluid 18 also flows from the brake fluid supply 16 through the first brake line 20 to the first port 30 as depicted in FIG. 2. The degree to which pressurized brake fluid 18 is delivered through the first port 30 is proportional to the degree of engagement of the brake pedal 12, or other activation means 10, by the operator.

The pressurized brake fluid 18 enters the first port 30 and acts against the brake fluid piston 36 thereby urging it toward the second end 40 of the first valve chamber 34. The first valve chamber spring 38 simultaneously acts against the pressurized brake fluid 18. As the pressure of the brake fluid 18 increases, it overcomes the force of the spring 38 and the brake fluid piston 36 is moved toward the second end 40 of the first valve chamber 34.

The movement of the brake fluid piston 36 in the first valve chamber 34 moves the transmission fluid spool 44 toward the second end 58 of the second valve chamber 46.

This moves the first of the circular plates 50 so as to open the third port 66 connecting the source 62 for fluid pressure such as, for example, the pressurized transmission fluid 64, with the second valve chamber 46 and the transmission clutch housing 68. The amount of transmission fluid 64 allowed to move from the transmission fluid source 62 to the transmission clutch housing 68 depends upon the degree to which the third port 66 has been opened.

Transmission fluid 64 flows from the fourth port 70 of the second chamber 46 into the transmission clutch housing 68 to the first directional transmission clutch 74. Within the transmission clutch housing 68, the first directional transmission clutch 74 rotates in a first direction 108. The second directional transmission clutch 76 is simultaneously rotating in a second direction 110 opposite the first direction 108 with the drivetrain 78 of the vehicle. The transmission fluid 64 contacts the first directional transmission clutch 74 to provide it with a rotational pressure. The rotational pressure allows the first directional transmission clutch 74 to begin to counter the rotation of the drivetrain 78 thus urging the drivetrain in the first direction thereby slowing, or braking, the drivetrain 78.

When braking is no longer desired, the vehicle operator disengages the brake system activation means 10 causing the brake fluid pressure 18 in the first brake line 20 to decrease. The reduction in brake fluid pressure 18 in the first brake line 20 similarly reduces the brake fluid pressure 18 in the first valve chamber 34 allowing the first valve chamber spring 30 to move the brake fluid piston 36 toward the first end 32 of the first chamber 34.

Movement of the brake fluid piston 36 toward the first end 32 of the first chamber 34 causes the transmission fluid spool 44 to move toward the first end 56 of the second chamber 46. Movement of the transmission fluid spool 44 toward the first end 56 of the second chamber 46 causes the first circular plate 50 to begin to close fluid communication between the transmission clutch housing 68 and the source 62. This closure reduces the transmission fluid 64 to the first directional clutch 74 thereby reducing its rotational pressure upon the drivetrain 78.

The first 38 and second 60 valve chamber springs may each be adjusted so that the first directional transmission clutch 74 begins slowing the drivetrain 78 as described above before, after or during the engagement of the service brakes 26.

In the process of using the second embodiment of the above-described vehicle braking system brake fluid pressure 18 is supplied to both the spring apply, hydraulic release brakes 82 and the first port 30 when braking is not desired as depicted in FIGS. 3 and 4. Engagement of the vehicle brake system activation means 10, such as, for example, the brake pedal 12, reduces the brake fluid 18 to the spring apply, hydraulic release brakes 82 and to the first port 30 shown in FIG. 4. The reduction in the brake fluid 18 allows the first valve chamber spring 38 to move the brake fluid piston 36 toward the first end 32 of the first valve chamber 34.

The movement of the brake fluid piston 36 toward the first end 32 of the first valve chamber 34 begins to close the second port 42. Closing the second port 42 closes the supply of brake fluid 18 to the spring apply, hydraulic release brakes 82 causing them to engage.

Movement of the brake fluid piston 36 toward the first end 32 of the first valve chamber 34 allows the transmission fluid spool 44 to move toward the first end 56 of the second valve chamber 46. This moves the first 50 of the circular plates so as to open the third port 66 connecting the source 62 with the second valve chamber 46 and the transmission clutch housing 68. Transmission fluid 64 moves from the transmission fluid source 62 into the transmission clutch housing 68 to the first directional transmission clutch 74 to brake the drivetrain 78 as described above.

When braking is not longer desired, the vehicle operator disengages the brake system activation means 10 causing the brake fluid 18 in the first brake line 20 to increase. The increase in brake fluid 18 in the first brake line 20 similarly increases the brake fluid 18 in the first valve chamber 34 causing the brake fluid piston 36 to move toward the second end 40 of the first chamber 34. This movement begins to open the second port 42 and brake fluid 18 is supplied to the spring apply brakes 82. The first of the circular plates 50 of the spool 44 begins to close the third port 66 closing the source 62 from the transmission clutch housing 68.

In the process of using the third embodiment of the above-described vehicle brake system the brake fluid sensor 84 senses brake fluid 18 pressure in the first brake line 20 and generates a brake fluid pressure signal 112 proportional to the sensed pressure as depicted in FIG. 5. An electronic controller 86 receives the brake fluid pressure signal 112 and provides a signal 114 to the at least one directional clutch proportional solenoid 88. The directional clutch proportional solenoid 88 is preferably connected to a source 62 for fluid pressure such as, for example, the pressurized transmission fluid 64 and a transmission clutch housing 68 as described above.

The directional clutch proportional solenoid 88 opens proportionally to the strength of the braking signal 114 received by the controller 86. A braking signal 114 indicating light braking causes the solenoid 88 to allow a relatively small amount of pressurized transmission fluid 64 to flow from source 62 into the transmission clutch housing 68. Conversely, a strong braking signal 114 indicating heavy braking causes the solenoid 88 to allow a relatively large amount of pressurized transmission fluid 64 to flow from the source 62 into the transmission clutch housing 68.

The transmission clutch housing 68 having first 74 and second 76 directional transmission clutches therein operates substantially as disclosed above to slow, or brake, the vehicle drivetrain 78. The controller 86 can signal the solenoid 88 to open before, during or after the engagement of the service brakes 26.

In the process of using the fourth embodiment of the above-described vehicle braking system engagement the brake system activation means 10 operates the electronic controller 86, the directional clutch proportional solenoid 88 and the first 74 and second 76 directional clutches as described above and depicted in FIG. 6. The electronic controller 86 also provides an electronic signal 116 to the service brake proportional solenoid 90 to open proportionally to the engagement of the brake system activation means 10. Thus, for example, upon light engagement of the brake system activation means 10, the service brake proportional solenoid 90 opens to provide a relatively small amount of brake fluid 18 to the service brake system 26. Conversely, upon heavy engagement of the brake system activation means 10, the service brake proportional solenoid 90 opens to provide a relatively large amount of brake fluid 18 to the service brake system 26. The controller 86 can control the service brake proportional solenoid 90 to open before, after or during the engagement of the first 74 and second 76 directional clutches.

In the process of using the fifth embodiment of the above-described vehicle braking system engagement of the brake system activation means 10 operates the electronic controller 86, the directional clutch proportional solenoid 88 and the first 74 and second 76 directional clutches as described above and depicted in FIG. 7. Engagement of the brake system activation means 10 provides pressurized brake fluid 18 into the first port 94 of the mechanical pressure valve 92. The pressurized brake fluid 18 moves the brake fluid piston 102 toward the second end 100 of the mechanical pressure valve 92 thus opening up the second port 104 to the service brake system 26. Pressurized brake fluid 18 moves from the mechanical pressure valve 92 to the service brake system 26. The spring 98 can be adjusted so that the service brakes 26 are engaged before, after or during the engagement of the first 74 and second 76 directional transmission clutches. A reduction in brake pressure 18 causes the spring 98 to move the brake fluid piston 102 toward the first end 96 of the mechanical pressure valve 92 thereby closing off the brake fluid 18 supply to the service brakes 26.

In accordance with the provisions of the patent statutes, the present invention has been described in what is considered to represent its preferred embodiments, however, it should be noted that the invention can be practiced otherwise then as specifically illustrated and described without departing from its scope or spirit.

What is claimed is:

1. A vehicle braking system, comprising:
    (a) a vehicle brake system activation means for receiving a braking signal;
    (b) a pressure sensor for sensing the pressure of a brake fluid in said vehicle brake system and generating a brake fluid pressure signal;
    (c) a controller for receiving said brake fluid pressure signal from said sensor;
    (d) a clutch solenoid connected to said controller, a pressurized transmission fluid supply and a first directional transmission clutch rotating in a first direction;
    (e) a second directional transmission clutch rotating in a second direction opposite said first direction with a vehicle drivetrain, both said first and said second directional transmission clutches are connected to said vehicle drivetrain, said pressurized transmission fluid causing said first directional transmission clutch to urge said drivetrain in said first direction; and
    (f) a service brake system is connected to said vehicle brake activation means for selective engagement of at least one service brake.

2. The system of claim 1, wherein said service brake system is comprised of at least one spring apply hydraulic release brake.

3. The system of claim 1, wherein said service brake system is comprised of at least one pressure apply brake.

4. The system of claim 1, wherein at least one valve is connected to said vehicle brake system activation means to selectively provide said brake fluid to said service brake system.

5. The system of claim 4, wherein said valve is a mechanical pressure valve having a first end, a second end, a moveable mechanical pressure valve piston located between said first end and second end and at least one spring adjacent said mechanical pressure valve piston and said second end.

6. The system of claim 5, wherein said mechanical pressure valve has at least one port for receiving pressurized brake fluid and at least one port for providing pressurized brake fluid to said service brake system.

7. The system of claim 4, wherein said valve is a service brake proportional solenoid.

\* \* \* \* \*